UNITED STATES PATENT OFFICE.

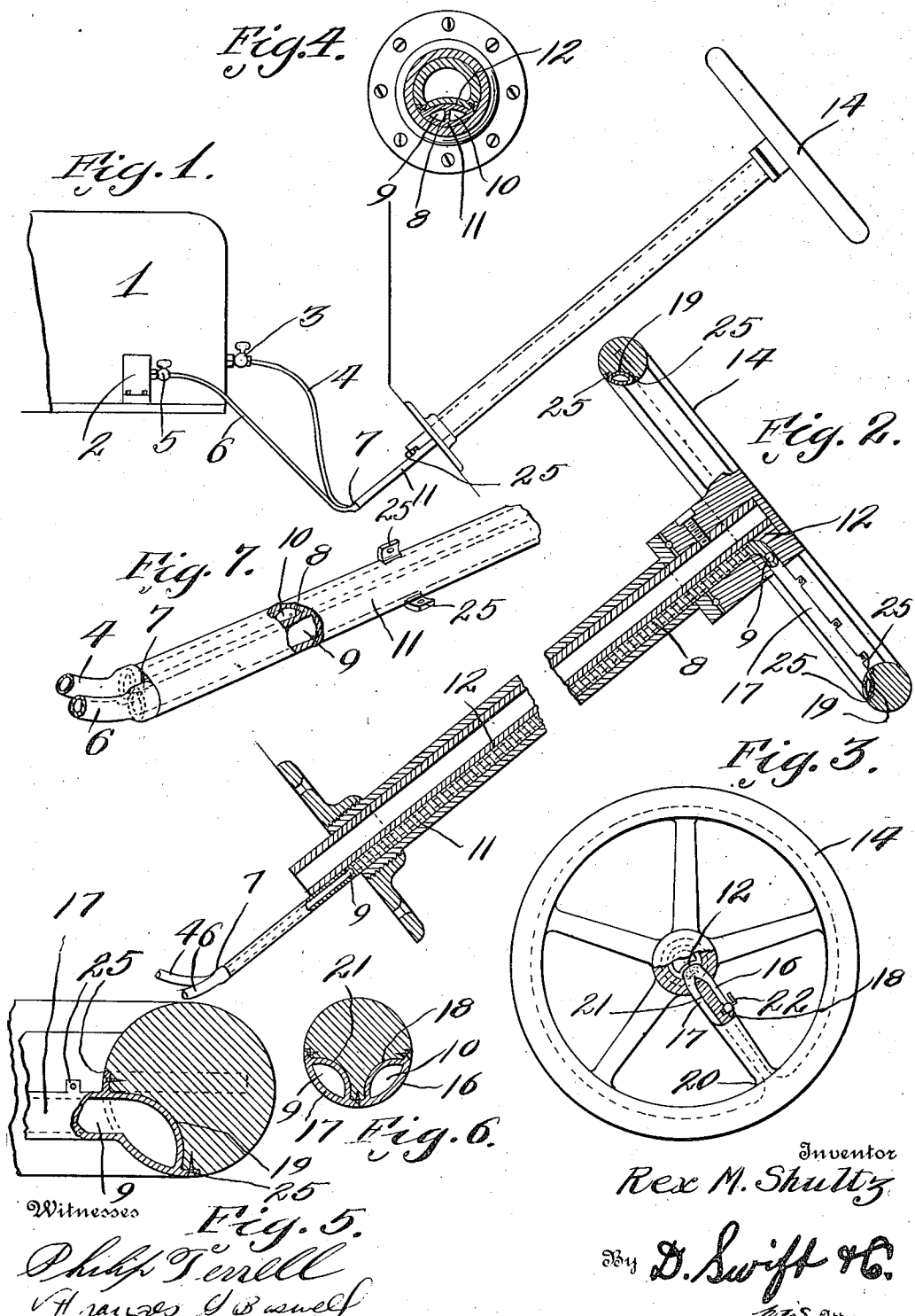

REX M. SHULTZ, OF IGNACIO, COLORADO.

HEATED AUTOMOBILE STEERING-WHEEL.

1,156,637.  Specification of Letters Patent.  Patented Oct. 12, 1915.

Application filed March 20, 1915. Serial No. 15,763.

*To all whom it may concern:*

Be it known that I, REX M. SHULTZ, a citizen of the United States, residing at Ignacio, in the county of La Plata and State of Colorado, have invented a new and useful Heated Automobile Steering-Wheel; and I do hereby declare the following to be a full, clear, and exact description of the invention, such as will enable others skilled in the art to which it appertains to make and use the same.

This invention relates to steering wheels, and particularly to an improved heating means (which together with the manner of connecting to the steering wheel and its column are the main features of the invention) designed for use in connection with the exterior or interior of an automobile steering wheel and column.

One of the features of the invention is the provision of a hot water tube forming a part of the steering column and also forming a part of the perimeter of the steering wheel, and in such wise as to maintain the usual cylindrical shape of the steering column and the perimeter, and so connected to the motor of the automobile as to obtain the hot water from the cooling system of the motor.

In practical fields the details of construction may necessitate alterations, falling within the scope of what is claimed.

The invention comprises further features and combination of parts, as hereinafter set forth, shown in the drawings and claimed.

In the drawings: Figure 1 is a view showing the application of the liquid heating device for a steering wheel. Fig. 2 is an enlarged detail view of the steering column showing the hot water tube forming a part of the column and the steering wheel thereon. Fig. 3 is a plan view of the steering wheel. Fig. 4 is a sectional view through the column in cross section. Fig. 5 is a cross sectional view through the rim of the steering wheel. Fig. 6 is a cross sectional view through one of the spokes of the wheel. Fig. 7 is a detail perspective view of the lower end portion of the two passage tube of the movable section of the steering column.

Referring more particularly to the drawings, 1 designates the engine, 2 the engine pump, and 3 denotes a two way valve cock, pump, and 3 denotes a two way valve cock, which is connected direct to the engine jacket, and which two way valve cock in turn has connected to it a tube 4. Connected to the engine pump is a one way valve cock 5, to which is connected a tube 6. The tubes 6 and 4 merge or blend together as shown at 7 into a single tubing but which is divided into two passages by the wall 8, the passage 9 being a continuation of the tube 6, while the passage 10 is a continuation of the passage through the tube 4. The two passage tube 11 fits the longitudinal recess 12 of the steering column. Where the steering wheel 14 connects to the column the two passage tube 11 extends into two branches 16 and 17. The branch 16 fits a recess 18 of one of the spokes of the steering wheel and extends to and fits a recess 19 of the inner lower portion of the rim of the steering wheel, extending about the inner lower portion of the steering wheel, and merges into the branch 17, as shown at 20, which branch 17 fits a recess 21 corresponding to the recess 18. The branch 16 is provided with a valve 22 for controlling the heated water from the pump back to the water jacket of the engine. The heating tube of the steering wheel is provided with small ears 25 for the reception of screws or other fastening means to hold the tube in place, said tube fitting the steering wheel, in such wise as not to alter the usual cylindrical shape of the rim of the wheel, and the tube of the steering column is like wise constructed, in order to not alter the shape of the steering column.

The conducting tubes may be any convenient shape or length, just so long as the principles of the invention are followed, and it may be found necessary to locate the heating tube in other ways, within the limits of that which is claimed.

The invention having been set forth, what is claimed as new and useful is:—

1. In combination with a steering column having a recess extending the length of the column and being crescent-shaped in cross section, a heating tube seated in said recess and having two passages, one having connections with the water jacket of the engine, the other having connections with the engine pump, said tube of the column terminating adjacent the steering wheel into two branches, each fitting one side of a spoke of the steering wheel and extending about the rim of the wheel and merging into the opposite rim.

2. In combination with a stationary tubular column, a hollow steering column rockable in the stationary column adapted to contain a part of the connections between the throttle or carbureter control and the carbureter, said rockable column having its wall longitudinally depressed, a steering wheel movable with the rockable column, the rim of the wheel being formed with a recess extending annularly about the inner lower portion of the rim, one of the spokes of the wheel having oppositely arranged recesses extending longitudinally of the spoke, a fluid containing tube fitting the recess of the rim and merging into two sections fitting the recesses of the spoke, the two sections of the tube which fit the recesses of the spoke merging into a single tube fitting the depression of the rockable column and being secured thereto to rock therewith, said single tube of the rockable column having two passages, one having connections with the engine jacket, and the other with the engine pump, and means for controlling the heating fluid.

In testimony whereof I have signed my name to this specification in the presence of two subscribing witnesses.

REX M. SHULTZ.

Witnesses:
HANS ASPAAS,
M. E. TURNER.